G. W. FREELAND.
RECORDING MECHANISM.
APPLICATION FILED JULY 13, 1910.
1,152,804.
Patented Sept. 7, 1915.
3 SHEETS—SHEET 3.
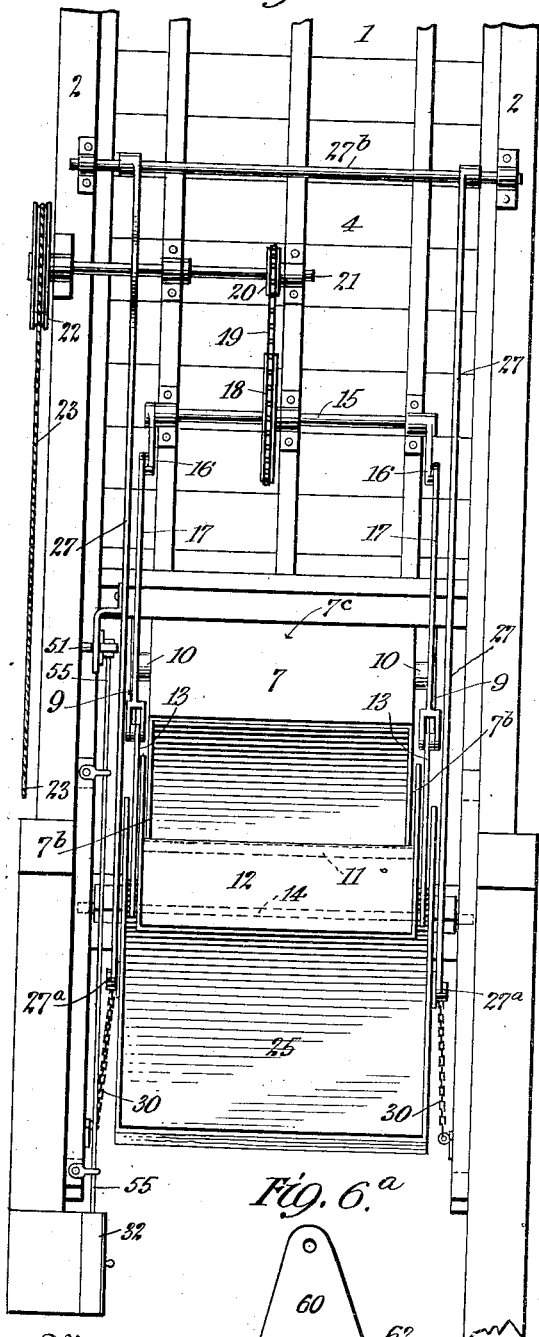
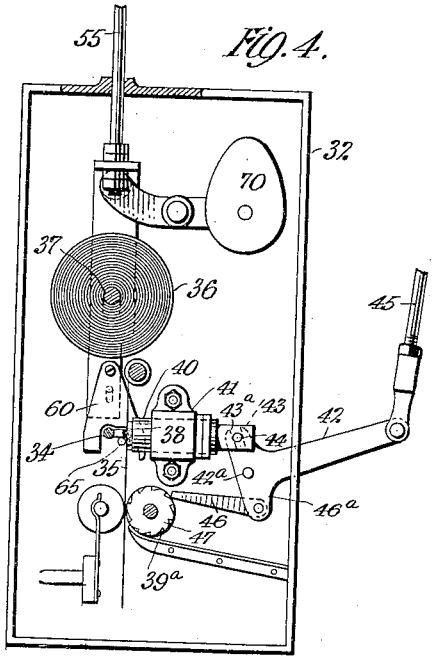
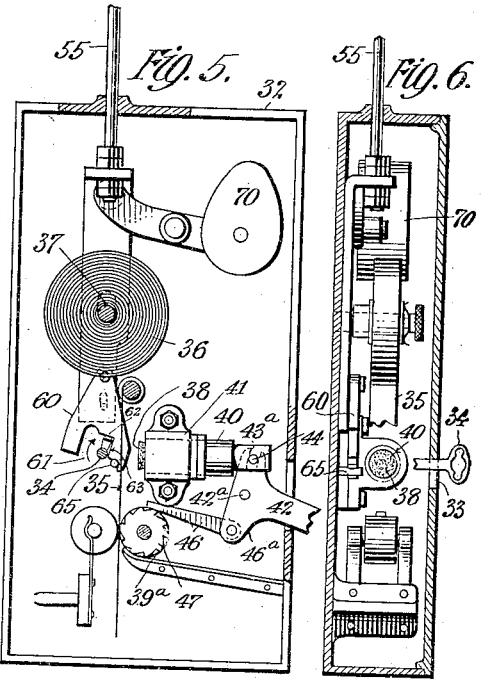
Witnesses:
Inventor
G. W. Freeland
By his Attorney
P. T. Dodge

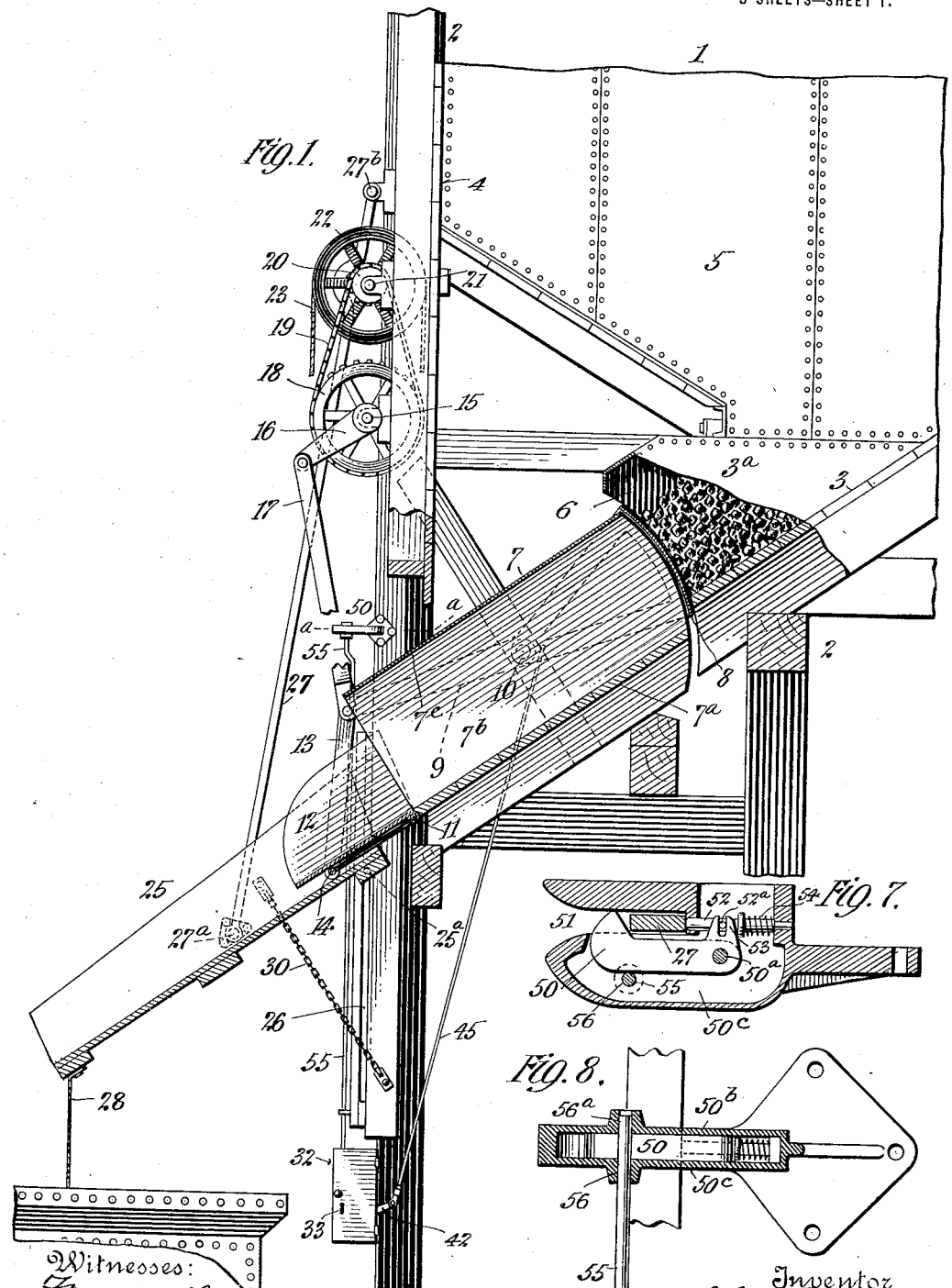

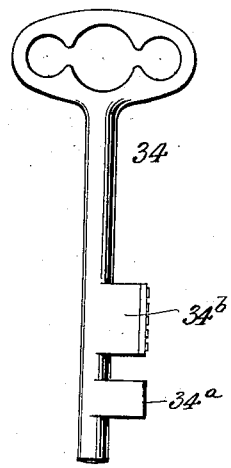
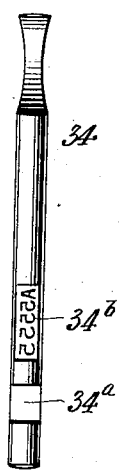
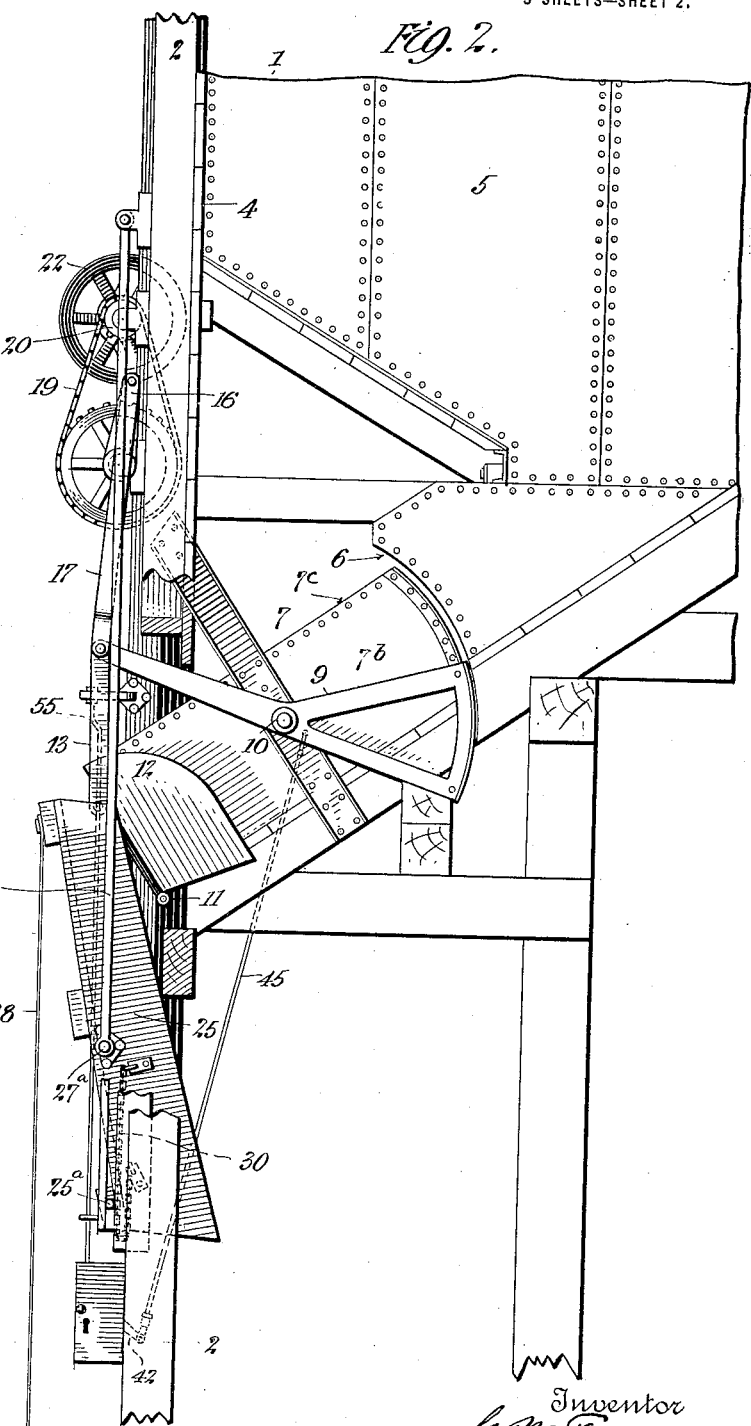

UNITED STATES PATENT OFFICE.

GEORGE W. FREELAND, OF MOLINE, ILLINOIS, ASSIGNOR TO WILLIAMS, WHITE & COMPANY, A CORPORATION OF ILLINOIS.

RECORDING MECHANISM.

1,152,804. Specification of Letters Patent. Patented Sept. 7, 1915.

Application filed July 13, 1910. Serial No. 571,762.

*To all whom it may concern:*

Be it known that I, GEORGE W. FREELAND, of Moline, county of Rock Island, and State of Illinois, have invented a new and useful Improvement in Recording Mechanism, of which the following is a specification.

My invention relates to coal pockets or storage bins employed for the storage and loading of coal into locomotive tenders, and like purposes, which bins are usually arranged at the side of the track, and sustained with their bottoms somewhat above the level of the tender to enable the coal to flow into the tender, suitable means being provided by which the engineer or attendant may control the discharge of the coal.

The objects of the present invention are to enable the engineer to draw off from the bin, successive charges of predetermined size or measure, and at the same time make a record of the charges drawn off, so that by this record, the quantity of coal taken for each engine may be determined.

With these ends in view, my invention consists in providing the storage bin with a measuring device adapted by successive actions to measure and deliver predetermined quantities of coal, said device being combined with a manually operated device of improved form and construction, whereby the engineer may conveniently and quickly operate the measuring device and deliver from the bin successive charges of predetermined quantity.

The invention consists also of a recording mechanism of improved form and construction adapted to indicate and record on a suitable surface or strip, the number of successive actions of the measuring device.

The invention consists further of a locking device for preventing the coal from being delivered by the measuring device, except by authorized persons furnished with the proper key to release the locking device, the said key being formed to coöperate with the recording mechanism in such manner as to indicate the particular key employed, and consequently the identity of the engineer drawing the coal.

The invention consists also in the details of construction and combination of parts hereinafter described and claimed.

In the accompanying drawings: Figure 1 is a side elevation of a storage bin constructed in accordance with my invention. Fig. 2 is a similar view with the parts in a different position. Fig. 3 is a front elevation showing the parts in the position of Fig. 1. Fig. 4 is an enlarged view in elevation of the details of the recording device and the parts of the locking mechanism directly associated therewith. Fig. 5 is an end elevation of the same. Fig. 6 is a horizontal sectional plan view on the line *a—a* of Fig. 2, showing the latch for locking the delivery apron in an inoperative position. Fig. 6ª is a view of a detail. Fig. 7 is a side elevation on an enlarged scale of the parts shown in the preceding figure. Fig. 8 is a side elevation of the key which is carried by the engineer to release the locking mechanism, and which coöperates with the recording mechanism. Fig. 9 is an edge view of the same showing the designating characters thereon.

Referring to the drawings: 1 represents a storage bin or coal pocket sustained in suitable uprights 2, and comprising a downwardly inclined bottom 3, a front wall 4, and side walls 5. The front wall is provided with a discharge opening or mouth 6, in which is located a charge measuring device 7 of a construction adapted by successive actions to measure off and deliver charges or quantities of coal of predetermined size.

This device consists of an inclined bottom 7ª which forms a continuation of the inclined bottom of the bin and extends from said bin bottom to the lower end of the discharge opening. From the sides of the bottom 7ª, side walls 7ᵇ extend upwardly and are connected by a top wall 7ᶜ, said walls terminating at their rear ends at the forward ends of two plates 3ª extending outwardly and rearwardly and adjoining the side walls of the bin, these plates serving to direct the coal into the charge measuring device. The inclined bottom 7ª in connection with the side walls and top, constitutes an inclined trough, rectangular in cross-section, seated in the mouth of the bin, and communicating at its rear upper end with the body of the bin, and arranged at its forward lower end to discharge the coal from the bin.

The upper end of the trough, where it communicates with the interior of the bin, is adapted to be closed by a segmental gate 8, carried by the rear ends of two arms 9, pivoted between their ends, as at 10, to the sides of the trough, the construction being such that by the rocking of these arms on their axes, the segmental gate will be swung upwardly or downwardly to close or open the upper end of the trough. At its lower end, the trough has pivoted to its bottom, as at 11, a combined door and chute 12, which when swung upwardly, as shown in Fig. 2, will close the lower or delivery end of the trough, and when swung downwardly, will open the same and form in effect a sloping downward continuation of the bottom of the trough. The gate and door are adapted to operate in unison in such manner that when one is opened, the other will be closed, their coöperation in this manner acting, when the gate is opened, and the door closed, to permit the trough to be filled from the supply in the bin, these parts acting, when the gate is closed and the door open, to discharge the contents of the trough; the successive actions in this manner resulting in the successive discharges from the bin of definite and predetermined quantities of coal, each discharge being of the capacity of the trough. To effect this action of the parts in unison, the forward ends of the pivotal arms 9 have jointed to them, the upper ends of links 13, whose lower ends are pivoted, as at 14, to the bottom of the door, so that when the door is swung downwardly, the arms will be rocked and the gate will be swung upwardly; and when the door is swung upwardly to closed position, the arms rocking in the opposite direction, will swing the gate downwardly to open position. In order that these actions of the gate and door may be conveniently effected manually by the engineer to fill the tender of his engine, I provide a manually operating device consisting of the following parts: Journaled in the main frame of the bin structure, above the charge measuring device, is a transverse rock-shaft 15, provided on opposite ends with crank arms 16, having their free ends jointed to the upper ends of links 17, which latter are extended downwardly and connected with the links 13, before alluded to. By this arrangement, when the shaft is rocked forwardly, the crank arms will be swung downwardly and the links 13 and 17 lowered, thereby swinging the door down to open position, and the gate up to closed position; the reverse action of the shaft causing the parts to move in the reverse direction, with the result that the door will be closed and the gate opened. The rock-shaft is operated by means of a sprocket wheel 18 thereon connected by a sprocket chain 19 with a sprocket wheel 20 on a second rock shaft 21 journaled in bearings in the frame structure of the bin above the rock shaft 15. The upper rock-shaft has fixed to its ends a pulley or wheel 22, over which passes an endless rope 23, leading down within convenient reach of the engineer, by means of which the engineer may open and close said parts alternately and deliver successive charges of coal from the bin.

In connection with the charge measuring device described, I propose to employ a delivery apron or chute 25 to receive the charges from the measuring device and direct the same into the engine tender. This apron is in the form of an open trough with bottom and side walls, and is so mounted that it may be folded up to vertical position when not in use. In order that this may be effected, the side walls of the apron are provided near their rear ends with laterally extending studs 25$^a$ extending loosely, so as to slide freely, in vertical guide slots 26 formed in the inner faces of the frame structure of the bin at the front. The apron is guided in its movements and suspended when in extended operative position, by means of two links 27 pivoted at their lower ends to the sides of the apron, as at 27$^a$, and at their upper ends, as at 27$^b$, to the framing of the bin above the upper rock-shaft, before alluded to. In the upright position of the apron, as shown in Fig. 2, the studs 25$^a$ extend in the lower portion of the guide slots with the delivery end of the apron resting against the front of the bin, in which position of the parts the door of the measuring device will be held in fixed position and said measuring device thereby rendered inoperative. To extend the apron to operative position, the delivery end of the same is drawn downwardly by means of a rope 28 connected thereto, which action will cause the receiving end of the apron to move upwardly, with the studs sliding upwardly in the guide slots, and at the same time the lower end of the links will swing outwardly, with the apron turning down to the position shown in Fig. 1, and fulcruming on the links. In this position of the parts, the links will suspend the apron in its downwardly inclined position, the movement of its inner end upwardly being limited by means of a chain 30 connected with the side of the apron and front of the bin frame. The relation of the suspending links and guiding studs to the other parts is such, that the apron will be balanced in its movements, so that there will be little or no force required to shift the same from its operative to its inoperative position, and vice versa. With the apron in its operative extended position, as shown in Fig. 1, and with the door of the charge measuring device open, said door will lie flatly on the bottom of the apron, and will bridge the space between the lower end of the measuring device and upper end of the apron, thereby causing the coal to flow from the measuring trough onto the apron with no liability of leakage between them.

In order that a record may be made of the number of charges taken from the bin by the measuring device described, and in order also that such record will indicate the particular engine for which the coal is drawn, I provide a recording mechanism embodying a record surface or tape, which mechanism in the present instance is operatively connected with the charge measuring device in such a manner that the mechanism will be actuated by each action of the charge measuring device, and will, by coöperation with a suitable key or equivalent device carried by the engineer, and provided with printing or designating characters, make an impression on the record strip of such characters. In connection with this recording mechanism, I provide a locking mechanism for preventing the operation of the charge measuring device, which locking mechanism is adapted to be released by the key of the recording mechanism, the construction and relative arrangement of the parts being such that after the key is inserted and turned to release the locking device, said key will be retained beyond the control of the engineer, in printing position, and until the engineer again locks the measuring device against action. As a result of this arrangement and operation of the parts, while the measuring device is in a released position and ready to be operated to measure off successive charges, the recording mechanism will be in such operative condition that it will record with certainty the number of charges drawn away, there being necessary on the part of the engineer, an action which will render the charge measuring device inoperative, before he can remove the controlling key.

The recording mechanism is inclosed in a case 32 mounted on the bin framing within convenient reach of the engineer, which case contains a key hole 33 through which a key 34 may be inserted. This key is provided with a bit $34^a$ for operating the parts of the locking mechanism, as will presently be described, and is provided also with a lug $34^b$ having printing characters $34^c$ thereon to designate or identify a certain engine or engineer. In the present instance, numerals are employed as the designating characters, and correspond with the engine numbers.

Within the case 32, and running alongside the key hole, is a record surface in the form of a tape or band 35, leading from a supply roll 36 mounted on a spindle 37, and extending downwardly past an impression surface 38 and between feed rolls 39 and $39^a$, the intermittent rotation of the rolls in the manner presently to be described, acting to draw the record tape down past the impression surface, step by step, so as to expose fresh portions of the same to the printing characters. The impression surface 38 is in the present instance in the form of a cork block carried on the inner end of a horizontal plunger 40 mounted to slide back and forth in a guide 41 fixed to the case, and in the recording or printing action, this plunger is moved against the record tape so as to force the same against the impression surface on the key, the latter, when in printing position, being in the key hole in the position shown in Fig. 4, with its impression surface presented parallel with the record tape. The impression plunger in its printing action, is operated by connections therefrom to the charge measuring device, said connections comprising a rocker arm 42 pivoted as at $42^a$ to the casing and provided with a finger 43 having a slot $43^a$ embracing a pin 44 on the plunger. A rod 45 is jointed at its lower end to the outer end of the rocker arm, whence it extends upwardly outside of the casing and has its upper end jointed to one of the pivotal arms 9 of the charge measuring device, so that when the arm 9 is vibrated up and down, in the closing and opening movements of the gate and door of the measuring device, the plunger will be moved back and forth, its forward movement forcing the tape up against the printing key and causing the impression to be made on the tape, and its opposite movement releasing the tape to permit it to be advanced to present a fresh surface to the printing characters. The advance of the tape step by step is effected preferably by means of a feeding dog 46 pivoted to a depending finger $46^a$ on the rocking arm, which dog engages a ratchet wheel 47 on the feed roll $39^a$, the arrangement being such that as the arm is rocked in the successive actions of the charge measuring device, the dog will be alternately advanced and retracted, and in this manner will turn the roll step by step, the relation of the dog and plunger being such, that the feed roll will be turned to advance the tape when the plunger moves back after making the impression.

By the mechanism described, it will be seen that for each upward movement of the gate of the charge measuring device, and the consequent downward movement of the door, such actions resulting in the delivery of a single discharge from the bin, the impression plunger will advance and force the tape against the printing key, thereby making an impression on the tape of the characters on the key, such impression indicating that a single charge has been drawn, and further indicating the particular engineer drawing the same.

The locking device heretofore alluded to to prevent the operation of the charge measuring device except by authorized persons, comprises a horizontal latch 50, shown more particularly in Figs. 7 and 8, adapted to confine one of the suspending links 27 of the apron 5 when said apron is folded in vertical position, in which position the apron lies flatly against the delivery door of the measuring device and prevents said door from being operated, thereby rendering the charge measuring device inoperative. The latch 50 is pivoted, as at 50$^a$, on a vertical axis between upper and lower cheek plates 50$^b$ and 50$^c$, extending outwardly from the forward portion of the bin framing, and the latch is adapted to swing across and close a vertical slot 51 formed in said plates, and in position to receive the link 27 when the latter moves back to vertical position in the folding of the apron, Fig. 7 showing the link in the slot and confined by the latch. The movement of the latch across the receiving slot is effected automatically by the passage of the link into the slot, which action is effected by a plunger 52 movable back and forth at the inner end of the slot, and provided with a pin 52$^a$ engaging in a slot in a finger 53 projecting laterally from the rear end of the latch, whereby the movement of the plunger back and forth will shift the latch on its pivot and swing the same across or free of the slot. The plunger is urged in one direction by a spring 54, the end of the plunger normally projecting into the inner end of the slot in the path of the incoming link. As the link moves back in the slot in the folding action of the apron, it will engage the projecting end of the plunger, and forcing the same back against the influence of the spring, will cause the latch to move laterally and close across the end of the slot. The latch is held locked in this position by a vertical locking rod 55, which extends downwardly and within the casing 32, where it is provided with means for coöperation with the key, and whereby the locking rod may be operated to release the latch. At its upper end, the rod passes through alining openings 56 and 56$^a$ in the cheek plates, respectively, and it is adapted to be moved vertically to a limited extent by the key, the upward movement of the rod causing it to be projected through said openings behind the latch 50, and in this manner holding the latch in its locked position across the slot, and thereby confining the link 27 therein. When the locking rod moves downwardly, it will be withdrawn from behind the latch, and the spring acting on the plunger will move the same forward and throw the latch laterally from across the slot, thereby releasing the link 27 and allowing the apron to be drawn down. In this position of the parts, the upper end of the locking rod will remain in the lower hole 56 of the lower cheek-plate, and the latch will extend above the upper end of the rod, thereby forming a stop which will prevent the rod from being moved upwardly. The control of the locking rod by means of the key, as before referred to, is effected through the medium of a swinging tumbler plate 60 on the lower end of the rod within the casing 32. This tumbler plate is formed in its lower end with a recess 61 having a horizontal surface 62, a vertical surface 63 adjoining the same, and at one side, a socket 64. When the locking rod is raised and extended at its upper end through the openings in the cheek plates, the tumbler plate is swung to the left (Fig. 5) and supported so as to hold the rod up, by means of the socket 64 resting on a pin 65 fixed to the casing at the side of the key hole. In this position of the parts, the latch 50 is held locked by the rod, which extends through the openings in the cheek plates, and the latch confines the link 27 in a vertical position with the apron 25 raised and lying across the front of the charge measuring device. The rod is unlocked by the insertion of the key, and the turning of the same to the right, with the result that its bit will engage surface 63 on the tumbler plate and push the same off the supporting pin 65, whereupon the rod will fall by gravity to the position shown in Fig. 4, thereby withdrawing its upper end from behind the latch 50 and releasing the same. On the continued movement of the key, its bit will encounter pin 65 and come to rest in a horizontal position, with the tumbler plate resting on and supported by the bit, and the printing characters on the keys presented to the record tape parallel therewith and opposite the impression surface on the impression plunger. In this position of the parts, the upper end of the locking rod will be covered by the latch 50, thereby holding the rod down and confining the key in printing position. The apron 25 being drawn down when the parts are in this position, the charge measuring device becomes operative to deliver successive charges, each action causing a record to be made on the tape. The printing key will be held in its active printing position as long as the link 27 is free of the slot in the cheek plates and with the apron down, and cannot be removed until the apron is thrown up and the link 27 moved back into the slot in the cheek plates, such action covering up the door of the charge measuring device and rendering the same inoperative.

The weight of the locking rod may be balanced in any suitable manner. I have shown for this purpose a weighted lever 70 provided within the casing 32 and bearing at its end against the locking rod, the weight tending to sustain the weight of the rod.

It is seen by the construction described that after the charge measuring device is once rendered operative by the unlocking of the apron suspending link, and by the extension of the apron to operative position to expose the door of said device, the recording device becomes at the same time operative and will remain so as long as the apron is down, making a record of each charge delivered by the actuation of the measuring device. This arrangement and action of the parts renders it impossible for the engineer to deliver the charges without making a record of such delivery, because the key is confined in printing position and cannot be removed while the charge measuring device is operative, and until the engineer has thrown the apron up and thereby closed the same across the door of the charge measuring device. It will be observed that the key with its printing characters forms in effect, in connection with the impression plunger, a printing mechanism which while normally inoperative, will when once rendered operative, remain so as long as the charge measuring device is operative, it being possible to render said printing mechanism inoperative only after the charge measuring device has in turn been rendered inoperative by the folding of the apron 25 to vertical position. It follows, therefore, that the recording mechanism is wholly beyond the control of the engineer, so that he will not be able to draw off charges from the bin without making a record of the same.

The operation is as follows: The parts being in the position shown in Fig. 2, with the apron in folded vertical position and closed across the door of the charge measuring device, with the latter inoperative, the suspending link 27 will be seated in the slot in the cheek plates and confined therein by the latch 50, and the latter held locked by the locking rod extending through the holes in the cheek plate, with the locking rod sustained in this position by the engagement of the socket in the tumbler plate with the supporting pin 65. The engineer now inserts his key and turns the same to the right to the position shown in Fig. 4, such action resulting in the shifting of the tumbler plate to the right off the supporting pin, thereby allowing the locking rod to drop down onto the key bit, this action withdrawing the upper end of the rod from behind the latch 50 and releasing the latter. The engineer now draws the delivery apron 25 downwardly to the position shown in Fig. 1, thereby exposing the door of the charge measuring device and rendering said device operative. By means of the endless rope, he operates the charge measuring device successively and thereby delivers successive charges of coal onto the apron, whence it flows into the tender, each actuation of the charge measuring device resulting in the operation of the recording device, and the printing on the tape surface, of successive impressions corresponding to the characters on the key. When a sufficient quantity of coal has thus been delivered, the apron is swung upwardly to the position shown in Fig. 2, the suspending link 27 passing into the slot in the cheek plates and engaging the plunger therein, swinging the latch 50 across the slot in the plate. The key is then turned to the left, such action, through the engagement of its bit with the tumbler plate, lifting the latter and the locking rod upwardly, and at the same time swinging the plate to the left to carry its socket onto the supporting pin. As the rod moves upwardly by this action, its end will pass upwardly through the upper opening in the upper cheek plate and behind the latch 50 and lock the same across the slot. The key may then be removed from the key-hole.

It is manifest that my invention in its broader aspects is not limited to the specific details shown and described, as such details constitute merely one embodiment of my invention, which embodiment has been found in practice to accomplish the results sought. For instance, other forms of recording mechanism may be employed than the specific type shown, and other connections than those shown may be employed between the charge measuring device and the recording mechanism. So also other forms of devices than those shown for measuring off successive charges of the coal may be employed, provided the operation of the coöperating mechanism is substantially as above described.

Having thus described my invention, what I claim is:

1. In combination with a periodically movable member whose movements are to be recorded; a recording mechanism operated thereby and including a printing member, a movable impression device, a record tape between the printing member and impression device and a feeding device for the record tape; a rocker arm connected with the tape feeding device and with the impression device for operating said devices; and a connection between the periodically movable member and the rocker arm for rocking the latter.

2. In combination with a periodically movable member whose movements are to be recorded; a movable means coöperating with said member to render the same inoperative; a releasable locking device adapted to lock the movable means against movement; a recording mechanism adapted to be operated by the movements of the said periodically movable member to record said movements, said recording mechanism including a key coöperating with the locking device and movable to release the same, and said key acting when thus moved, to render the recording mechanism operative.

3. In combination with a periodically movable member whose movements are to be recorded; a releasable locking mechanism cooperating with said member to hold the same against action; a record tape, an identifying key adapted to coöperate with said record tape in making an impression of the identifying marks on the key, said key adapted, when turned to printing position, to coöperate with the locking mechanism in releasing the same, and the said locking mechanism being constructed to lock the key in printing position when the locking mechanism is operated to release the periodically movable member.

4. In combination with a periodically movable member whose movements are to be recorded; movable means coöperating therewith for rendering said member inactive; a releasable locking device for locking said movable means against movement; and a recording mechanism operated by said periodically movable member and including a key movable to printing position, said key operating when so moved to release the locking device and permit the periodically movable member to operate.

5. In combination with a periodically movable member whose movements are to be recorded; a movable device for rendering the same inoperative; a recording mechanism normally inoperative and adapted to be operated by the periodically movable member to record the movements of the latter, said recording mechanism including a removable identifying key; suitable connections between the periodically movable member and recording mechanism for operating the latter; a locking mechanism for locking the movable device in position to maintain the periodically movable member inoperative, said locking mechanism being released to permit the periodically movable member to operate, by the insertion and turning of the key to operative position, and said locking mechanism acting to lock the key in operative position, and being operable to release the key, when the movable device is moved to render the periodically movable member inoperative.

6. In combination with a periodically movable member whose movements are to be recorded, a recording mechanism adapted to be operated by said member and including an identifying key from which impressions are made, a shiftable locking rod for locking said member against action, and a tumbler plate carried by the rod and adapted when in one position to hold the rod in locking position, said plate being adapted to be acted on by the key and moved to another position to permit the locking rod to be shifted to release the periodically movable member.

7. In combination with a periodically movable member whose movements are to be recorded, a recording mechanism adapted to be operated by said member and including a movable identifying printing key, and a shiftable locking member for locking said member against action and adapted to be operated by the identifying key to release said member, said locking member acting when in released position to hold the key in printing position.

8. In combination with a periodically movable member whose movements are to be recorded, a recording mechanism adapted to be operated by said member and including an identifying printing key movable to and from printing position, and a rising and falling locking member for locking said member and adapted to be supported in raised locking position, the said key acting when moved to printing position to release the locking member and permit it to descend to unlocking position, and said key acting when moved from printing position to lift the locking member to locking position.

9. In combination with a recording mechanism including an identifying printing key movable to and from printing position, a periodically movable member above the recording mechanism, connections extending downwardly from and movable member and connected with the recording mechanism for operating the latter by the movement of the said member, and a locking member for the periodically movable member extending downwardly therefrom and terminating adjacent the recording mechanism in position to be acted on by the printing key.

10. In combination with a periodically movable member whose movements are to be recorded, a recording mechanism adapted to be operated thereby and including an identifying printing key movable to and from printing position, a rising and falling locking rod for the periodically movable member, a tumbler plate on said rod, and a fixed supporting member adapted to sustain the tumbler plate with the rod in elevated locking position, the said printing key adapted when moved to printing position to shift the tumbler plate off its support, and the said supporting member being in position to be engaged by the key and sustain the same in printing position.

In testimony whereof I hereunto set my hand this 22nd day of June, 1910, in the presence of two attesting witnesses.

GEORGE W. FREELAND.

Witnesses:
C. R. ROSBOROUGH,
G. A. FORD.

Copies of this patent may be obtained for five cents each, by addressing the "Commissioner of Patents. Washington, D. C."